US012776824B2

(12) United States Patent
Zhang et al.

(10) Patent No.: US 12,776,824 B2
(45) Date of Patent: Oct. 27, 2026

(54) OPEN-LOOP TRANSMISSION WITH TRANSMIT DIVERSITY IN ORBITAL ANGULAR MOMENTUM MULTIPLEXING BASED COMMUNICATIONS

(71) Applicant: QUALCOMM Incorporated, San Diego, CA (US)

(72) Inventors: Danlu Zhang, San Diego, CA (US); Min Huang, Beijing (CN); Yu Zhang, San Diego, CA (US); Hao Xu, Beijing (CN)

(73) Assignee: QUALCOMM Incorproated, San Diego, CA (US)

( * ) Notice: Subject to any disclaimer, the term of this patent is extended or adjusted under 35 U.S.C. 154(b) by 319 days.

(21) Appl. No.: 18/562,579

(22) PCT Filed: Jul. 13, 2021

(86) PCT No.: PCT/CN2021/105930
§ 371 (c)(1),
(2) Date: Nov. 20, 2023

(87) PCT Pub. No.: WO2023/283799
PCT Pub. Date: Jan. 19, 2023

(65) Prior Publication Data
US 2024/0305355 A1 Sep. 12, 2024

(51) Int. Cl.
*H04B 7/06* (2006.01)
*H04B 7/10* (2017.01)

(52) U.S. Cl.
CPC ............ *H04B 7/0697* (2013.01); *H04B 7/10* (2013.01)

(58) Field of Classification Search
CPC ...... H04B 7/0413; H04B 7/10; H04B 7/0697; H04L 5/001; H04L 5/0023; H04L 5/04; H04L 27/2601
See application file for complete search history.

(56) References Cited

U.S. PATENT DOCUMENTS 9,860,013 B2 * 1/2018 Yu .......................... H04B 10/11
11,974,263 B2 * 4/2024 Choi ........................ H04B 7/10
2015/0188660 A1 7/2015 Byun et al.
2017/0012732 A1 1/2017 Kowalevicz et al.
(Continued)

FOREIGN PATENT DOCUMENTS

CN 110177067 A 8/2019
WO WO-2021133412 A1 7/2021

OTHER PUBLICATIONS

International Search Report and Written Opinion—PCT/CN2021/105930—ISA/EPO—Feb. 25, 2022.

*Primary Examiner* — Rasheed Gidado
(74) *Attorney, Agent, or Firm* — Harrity & Harrity, LLP

(57) ABSTRACT

Various aspects of the present disclosure generally relate to wireless communication. In some aspects, a transmitter of an orbital angular momentum (OAM) multiplexing based communication may determine an OAM azimuth mode assignment for open-loop transmission of a data stream using transmit diversity, wherein the OAM azimuth mode assignment comprises an assignment of two or more OAM azimuth modes to the data stream. The transmitter may transmit, to a receiver of the OAM multiplexing based communication, the data stream based at least in part on the OAM azimuth mode assignment. Numerous other aspects are described.

30 Claims, 13 Drawing Sheets

(56) References Cited

U.S. PATENT DOCUMENTS

| | | | | |
|---|---|---|---|---|
| 2017/0117626 | A1* | 4/2017 | Sajuyigbe | H01Q 1/523 |
| 2018/0234139 | A1* | 8/2018 | Djordjevic | H01Q 3/34 |
| 2019/0334609 | A1* | 10/2019 | Alavi | H01Q 3/34 |
| 2020/0313307 | A1* | 10/2020 | Lee | H04B 7/0697 |

* cited by examiner

OPEN-LOOP TRANSMISSION WITH TRANSMIT DIVERSITY IN ORBITAL ANGULAR MOMENTUM MULTIPLEXING BASED COMMUNICATIONS

CROSS-REFERENCE TO RELATED APPLICATION

This application is a 371 national stage application of PCT Application No. PCT/CN2021/105930 filed on Jul. 13, 2021, entitled "OPEN-LOOP TRANSMISSION WITH TRANSMIT DIVERSITY IN ORBITAL ANGULAR MOMENTUM MULTIPLEXING BASED COMMUNICATIONS," which is hereby expressly incorporated by reference herein.

FIELD OF THE DISCLOSURE

Aspects of the present disclosure generally relate to wireless communication and to techniques and apparatuses for open-loop transmission with transmit diversity in orbital angular momentum multiplexing based communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a transmitter of an orbital angular momentum (OAM) multiplexing based communication includes a memory and one or more processors, coupled to the memory, configured to: determine an OAM azimuth mode assignment for open-loop transmission of a data stream using transmit diversity, wherein the OAM azimuth mode assignment comprises an assignment of two or more OAM azimuth modes to the data stream; and transmit, to a receiver of the OAM multiplexing based communication, the data stream based at least in part on the OAM azimuth mode assignment.

In some aspects, a receiver of an OAM multiplexing based communication includes a memory and one or more processors, coupled to the memory, configured to: receive, from a transmitter of the OAM multiplexing based communication, a data stream that is transmitted based at least in part on an OAM azimuth mode assignment for open-loop transmission of a data stream using transmit diversity, wherein the OAM azimuth mode assignment comprises an assignment of two or more OAM azimuth modes to the data stream; and refrain from transmitting OAM azimuth mode selection feedback associated with the data stream.

In some aspects, a method of wireless communication performed by a transmitter of an OAM multiplexing based communication includes determining an OAM azimuth mode assignment for open-loop transmission of a data stream using transmit diversity, wherein the OAM azimuth mode assignment comprises an assignment of two or more OAM azimuth modes to the data stream; and transmitting, to a receiver of the OAM multiplexing based communication, the data stream based at least in part on the OAM azimuth mode assignment.

In some aspects, a method of wireless communication performed by a receiver of an OAM multiplexing based communication includes receiving, from a transmitter of the OAM multiplexing based communication, a data stream that is transmitted based at least in part on an OAM azimuth mode assignment for open-loop transmission of a data stream using transmit diversity, wherein the OAM azimuth mode assignment comprises an assignment of two or more OAM azimuth modes to the data stream; and refraining from transmitting OAM azimuth mode selection feedback associated with the data stream.

In some aspects, a non-transitory computer-readable medium storing a set of instructions for wireless communication includes one or more instructions that, when executed by one or more processors of a transmitter of an OAM multiplexing based communication, cause the transmitter to: determine an OAM azimuth mode assignment for open-loop transmission of a data stream using transmit diversity, wherein the OAM azimuth mode assignment comprises an assignment of two or more OAM azimuth modes to the data stream; and transmit, to a receiver of the OAM multiplexing based communication, the data stream based at least in part on the OAM azimuth mode assignment.

In some aspects, a non-transitory computer-readable medium storing a set of instructions for wireless communication includes one or more instructions that, when executed by one or more processors of a receiver of an OAM multiplexing based communication, cause the receiver to: receive, from a transmitter of the OAM multiplexing based communication, a data stream that is transmitted based at least in part on an OAM azimuth mode assignment for open-loop transmission of a data stream using transmit diversity, wherein the OAM azimuth mode assignment comprises an assignment of two or more OAM azimuth modes to the data stream; and refrain from transmitting OAM azimuth mode selection feedback associated with the data stream.

In some aspects, an apparatus for OAM multiplexing based communication includes means for determining an OAM azimuth mode assignment for open-loop transmission of a data stream using transmit diversity, wherein the OAM azimuth mode assignment comprises an assignment of two or more OAM azimuth modes to the data stream; and means for transmitting, to a receiver of the OAM multiplexing based communication, the data stream based at least in part on the OAM azimuth mode assignment.

In some aspects, an apparatus for OAM multiplexing based communication includes means for receiving, from a transmitter of the OAM multiplexing based communication, a data stream that is transmitted based at least in part on an OAM azimuth mode assignment for open-loop transmission of a data stream using transmit diversity, wherein the OAM azimuth mode assignment comprises an assignment of two or more OAM azimuth modes to the data stream; and means for refraining from transmitting OAM azimuth mode selection feedback associated with the data stream.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, radio frequency chains, power amplifiers, modulators, buffer, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
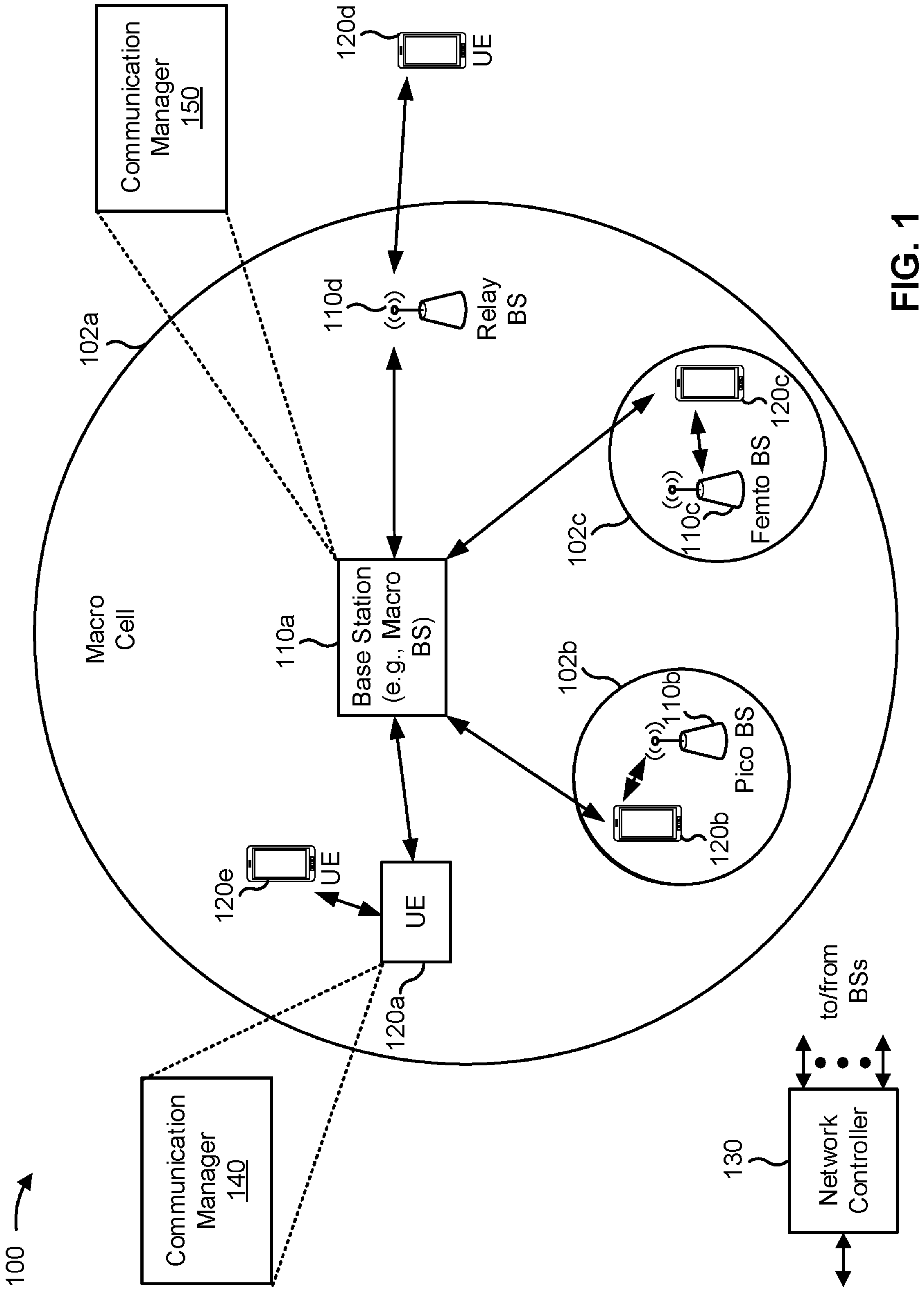
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "ITRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the transmitter may include a communication manager 140 or 150. As described in more detail elsewhere herein, the communication manager 140 or 150 may determine an OAM azimuth mode assignment for open-loop transmission of a data stream using transmit diversity, wherein the OAM azimuth mode assignment comprises an assignment of two or more orbital angular momentum (OAM) azimuth modes to the data stream; and transmit, to a receiver of the OAM multiplexing based communication, the data stream based at least in part on the OAM azimuth mode assignment. Additionally, or alternatively, the communication manager 140 or 150 may perform one or more other operations described herein.

In some aspects, the receiver may include a communication manager 140 or 150. As described in more detail elsewhere herein, the communication manager 140 or 150 may receive, from a transmitter of the OAM multiplexing based communication, a data stream that is transmitted based at least in part on an OAM azimuth mode assignment for open-loop transmission of a data stream using transmit diversity, wherein the OAM azimuth mode assignment comprises an assignment of two or more OAM azimuth modes to the data stream; and refrain from transmitting OAM azimuth mode selection feedback associated with the data stream. Additionally, or alternatively, the communication manager 140 or 150 may perform one or more other operations described herein.

As indicated above, FIG. 1 is provided as an example. Other examples may differ from what is described with regard to FIG. 1.

Figure 2:
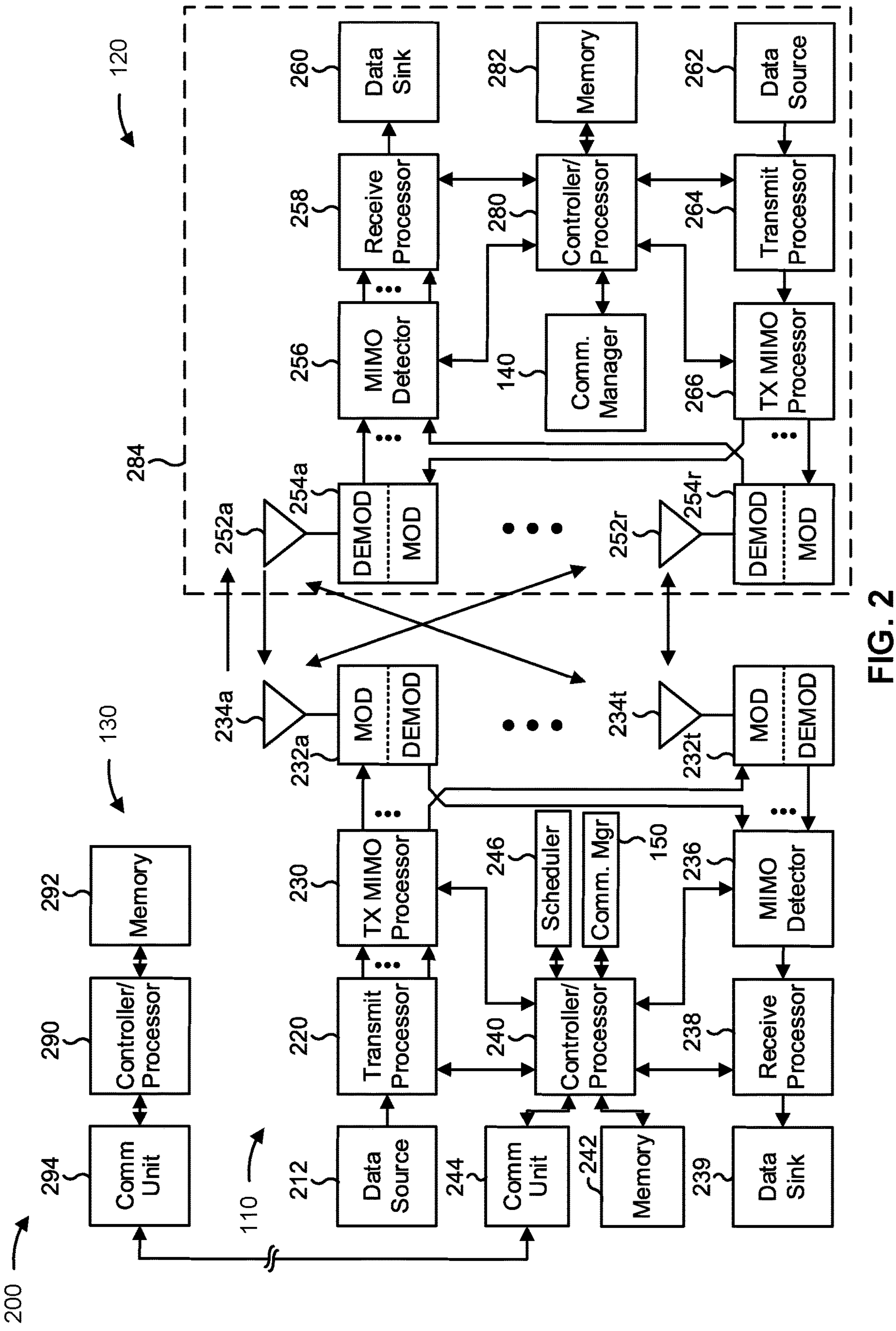
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 9-11.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 9-11.

Controller/processor 240 of base station 110, controller/processor 280 of UE 120, and/or any other component(s) of FIG. 2 may perform one or more techniques associated with open-loop transmission with transmit diversity in OAM multiplexing based communications, as described in more detail elsewhere herein. In some aspects, the transmitter or receiver described herein is the base station 110, is included in the base station 110, or includes one or more components of the base station 110 shown in FIG. 2. In some aspects, the transmitter or receiver described herein is the UE 120, is included in the UE 120, or includes one or more components of the UE 120 shown in FIG. 2. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some aspects, executing instructions may include running the instructions, converting the instructions, compiling the instructions, and/or interpreting the instructions, among other examples.

In some aspects, the transmitter includes means for determining an OAM azimuth mode assignment for open-loop transmission of a data stream using transmit diversity, wherein the OAM azimuth mode assignment comprises an assignment of two or more OAM azimuth modes to the data stream; and/or means for transmitting, to a receiver of the OAM multiplexing based communication, the data stream based at least in part on the OAM azimuth mode assignment. In some aspects, the means for the transmitter to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246. In some aspects, the means for the transmitter to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the receiver includes means for receiving, from a transmitter of the OAM multiplexing based communication, a data stream that is transmitted based at least in part on an OAM azimuth mode assignment for open-loop transmission of a data stream using transmit diversity, wherein the OAM azimuth mode assignment comprises an assignment of two or more OAM azimuth modes to the data stream; and/or means for refraining from transmitting OAM azimuth mode selection feedback associated with the data stream. In some aspects, the means for the receiver to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246. In some aspects, the means for the receiver to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
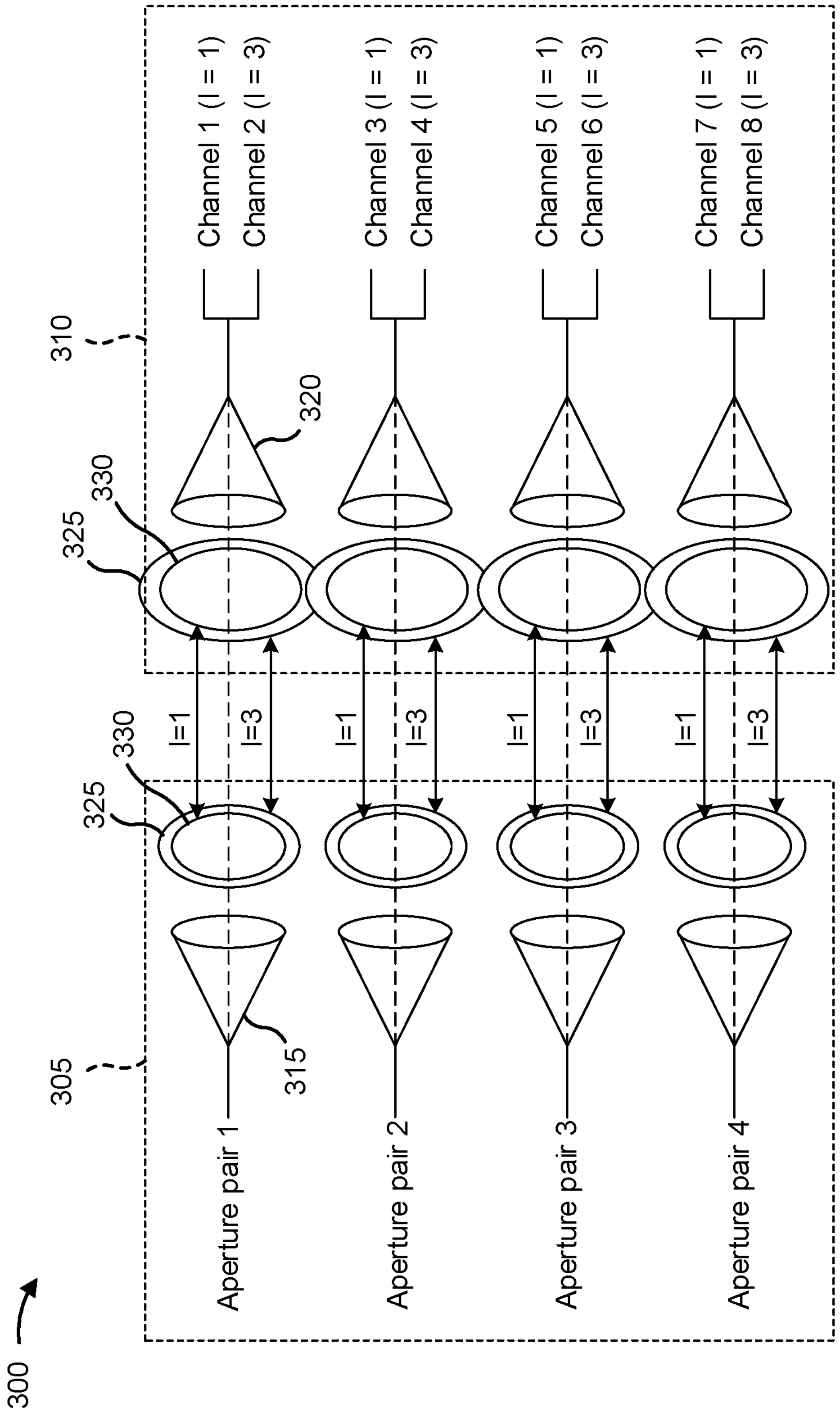
FIGS. 3-5 are diagrams illustrating examples of multi-aperture orbital angular momentum (OAM) multiplexing based communication, in accordance with the present disclosure.

FIG. 3 is a diagram illustrating an example 300 of multi-aperture OAM multiplexing based communication, in accordance with the present disclosure. As shown, a transmitter 305 and a receiver 310 may communicate with one another using OAM multiplexing based communication. According to various aspects, the transmitter 305 and/or the receiver 310 may be implemented in connection with one or more UEs (e.g., the UE 120 shown in FIG. 1, and/or the like), one or more base stations (e.g., the base station 110 shown in FIG. 1, and/or the like), one or more vehicles having one or more onboard UEs, and/or the like.

Communication based on OAM multiplexing may provide spatial multiplexing as a means to increasing high data rates. In OAM multiplexing based communication, the transmitter 305 may radiate multiple coaxially propagating, spatially-overlapping waves (OAM mode l= . . . , −2, −1, 0, 1, 2, . . . ), each carrying a data stream through a transmitter aperture 315 to a receiver aperture 320. An electromagnetic wave with a helical transverse phase of the form exp(iφl) may be used to carry an OAM mode waveform, where φ is the azimuthal angle and l is an unbounded integer (referred as the "OAM mode order," or, in some aspects, the "OAM mode"). Multiple OAM waves can be orthogonally transmitted using the same radio resources (time and/or frequency domains); thus, using OAM multiplexing can greatly improve communication spectrum efficiency.

To further increase the communication throughput, as shown in FIG. 3, multiple pairs of apertures (where each pair includes a transmitter aperture 315 and a corresponding receiver aperture 320) may be applied in parallel. In some cases, one pair of transmitter and receiver apertures can have M spatially-multiplexed channels (OAM modes), in which case N pairs of apertures can have MN spatially-multiplexed channels (OAM modes). The channels in one pair of apertures may be mutually orthogonal and have no or trivial mutual interference. However, the channels in different pairs of apertures may be non-orthogonal and have mutual interference.

For example, as shown in FIG. 3, as a beam travels from the transmitter aperture 315 to the corresponding receiver aperture 320, the outer bound (referred to herein as a radiation circle) 325, 330 of each beam mode expands. As shown, radiation circles 325 associated with waves with higher-order modes (e.g., l=3) expand faster than radiation circles 330 associated with waves with lower-order modes (e.g., l=1). As a result, the mutual interference is more severe among higher-order modes than among lower-order modes, and may cause a reduction in throughput, signal reliability, signal quality, and/or the like.

In some aspects, a higher-order mode (which also may be referred to as a "high mode," a "higher mode," and/or a "high-order mode") may refer to an OAM mode specified in a wireless communication specification as being a higher-order mode. In some aspects, a higher order mode may refer to a mode of a certain order or order range (e.g., a mode having an order greater than 1, etc.). In some aspects, a higher-order mode may refer to an OAM mode that is determined to be associated with a certain type of transmission, coding scheme, multiplexing scheme, and/or the like. For example, a higher-order mode may refer to an OAM mode associated with interference, spatial diversity transmissions, and/or the like.

Similarly, a lower-order mode (which also may be referred to as a "low mode," a "lower mode," and/or a "low-order mode") may refer to an OAM mode specified in a wireless communication specification as being a lower-order mode. In some aspects, a lower order mode may refer to a mode of a certain order or order range (e.g., a mode having an order less than 2, etc.). In some aspects, a lower-order mode may refer to an OAM mode that is determined to be associated with a certain type of transmission, coding scheme, multiplexing scheme, and/or the like. For example, a lower-order mode may refer to an OAM mode associated with a lack of interference, spatial multiplexing transmissions, and/or the like.

As indicated above, FIG. 3 is provided as an example. Other examples may differ from what is described with regard to FIG. 3.

Figure 4:
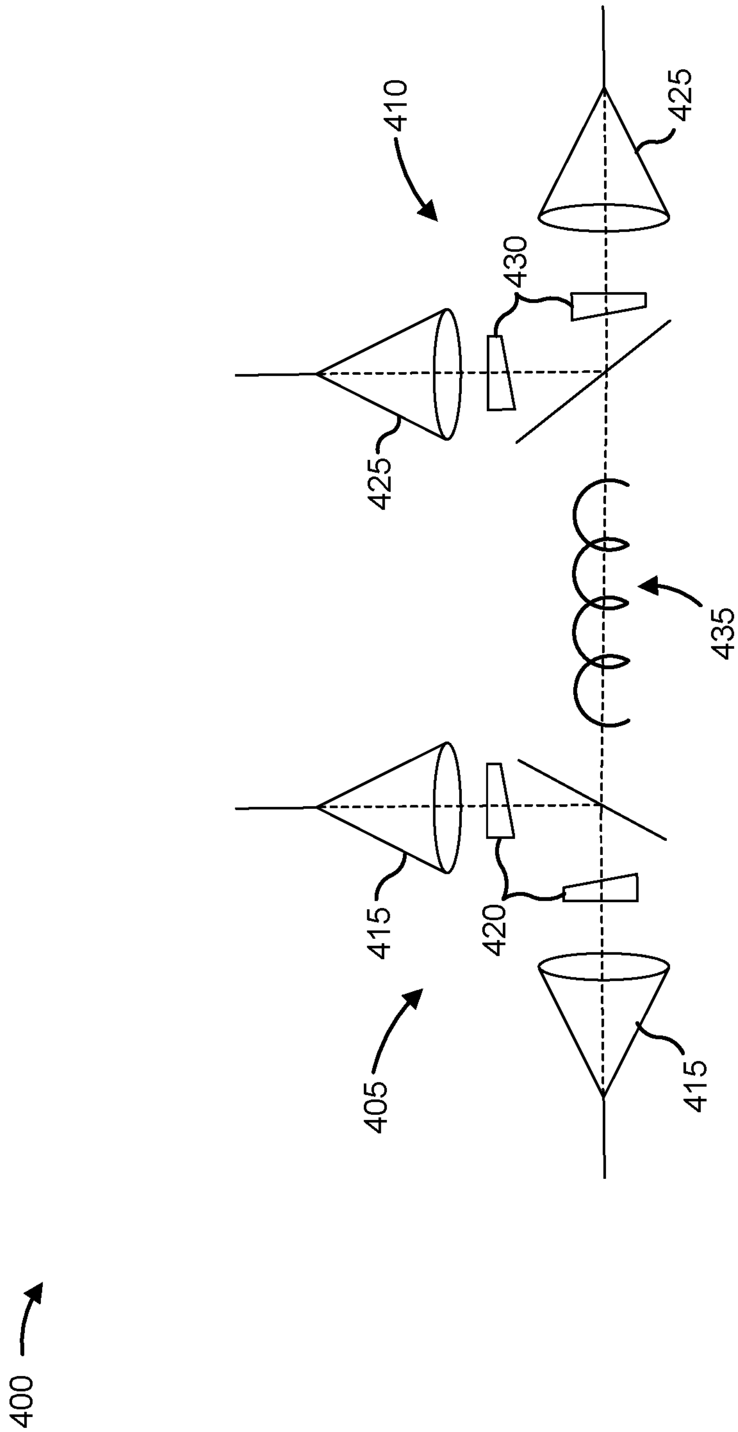

FIG. 4 is a diagram illustrating an example 400 of multi-aperture OAM multiplexing based communication, in accordance with the present disclosure. As shown, a transmitter 405 and a receiver 410 may communicate with one another using OAM multiplexing based communication. According to various aspects, the transmitter 405 and/or the receiver 410 may be implemented in connection with one or more UEs (e.g., the UE 120 shown in FIG. 1, and/or the like), one or more base stations (e.g., the base station 110 shown in FIG. 1, and/or the like), one or more vehicles having one or more onboard UEs, and/or the like.

As shown, the transmitter 405 may include a number of transmitter apertures 415 and a number of corresponding transmitter spiral phase plates (SPPs) 420. The receiver 410 may include a number of receiver apertures 425 and a number of corresponding receiver SPPs 430. Each transmitter aperture 415 may transmit a wave of one OAM mode (shown as, e.g., l=−1 and l=1). Each wave may be modulated by a corresponding transmitter SPP 420 to create a spiral wave 435. In some aspects, transmitter SPPs may be, or include, transmitter circles. Similarly, receiver SPPs may be, or include, receiver circles. For example, in some aspects, each SPP may be referred to as a transmitter circle (or receiver circle) due to the circular nature of cross sections of the spiral wave emitted (or received).

Each receiver aperture 425 may receive the wave 435 transmitted by a corresponding transmitter. The wave 435 may be demodulated by a corresponding receiver SPP 430 to convert the spiral wave into a donut-shaped wave that is received by the corresponding receiver aperture 425. Due to mutual orthogonality among OAM modes, the wave 435 of one OAM mode may not be received by a receiver aperture 425 corresponding to the other OAM mode.

As indicated above, FIG. 4 is provided as an example. Other examples may differ from what is described with regard to FIG. 4.

Figure 5:
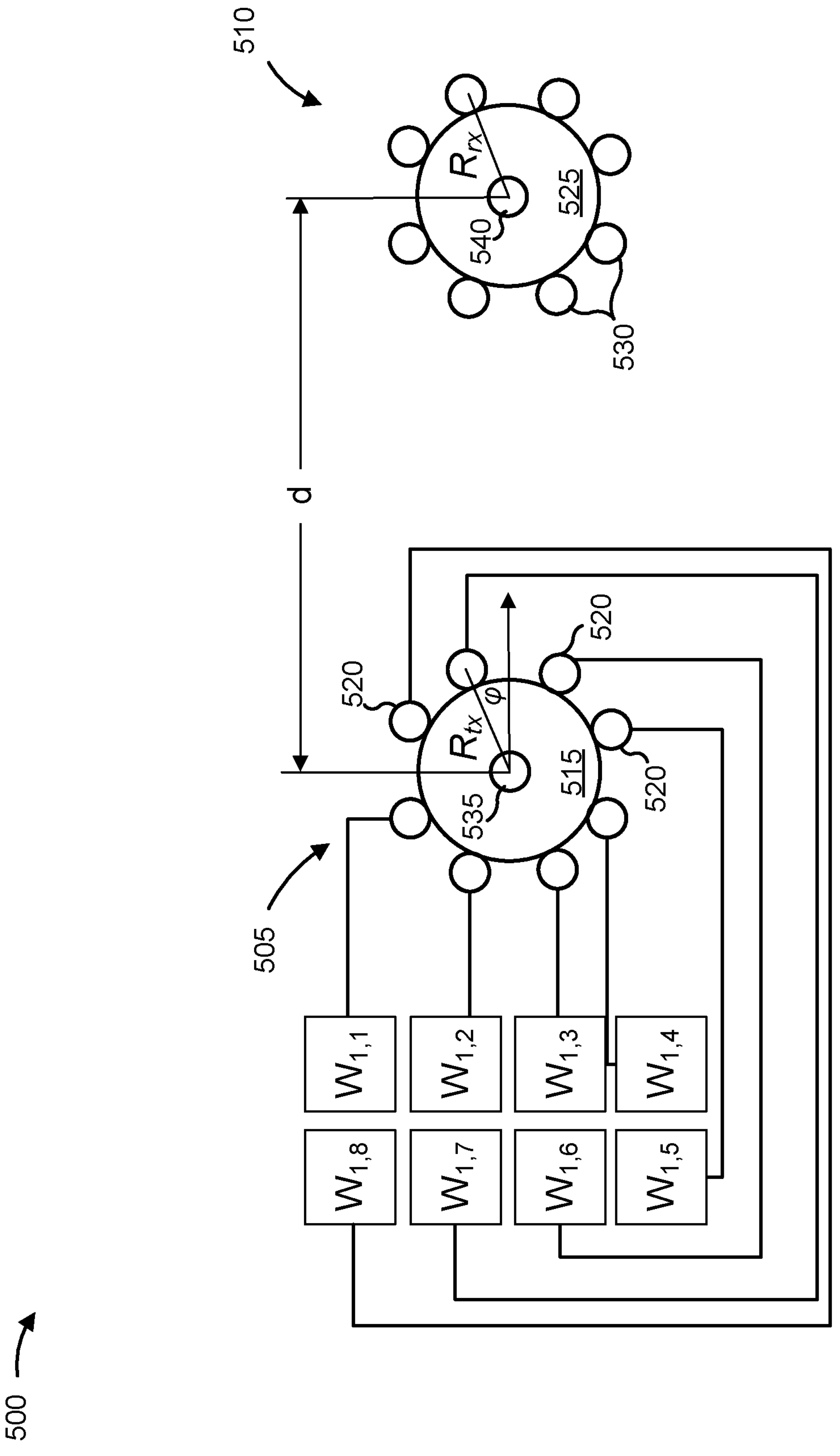

FIG. 5 is a diagram illustrating an example 500 of multi-aperture OAM multiplexing based communication using uniform circular array (UCA) antennas, in accordance with the present disclosure. As shown, a transmitter 505 and a receiver 510 may communicate with one another using OAM multiplexing based communication. According to various aspects, the transmitter 505 and/or the receiver 510 may be implemented in connection with one or more UEs (e.g., the UE 120 shown in FIG. 1, and/or the like), one or more base stations (e.g., the base station 110 shown in FIG. 1, and/or the like), one or more vehicles having one or more onboard UEs, and/or the like.

As shown, the transmitter 505 includes a UCA 515 having a plurality of OAM antennas 520 configured in a circle (or an at least approximately circular shape). Similarly, the receiver 510 includes a UCA 525 having a plurality of OAM antennas 530 equipped in a circle (or an at least approximately circular shape). By multiplying respective beamforming weights $w_1[w_{1,1}, w_{1,2}, \ldots, w_{1,8}]^T$ onto each antenna, the transmitter 505 may generate a signal port. If the weight of each antenna 520 is equal to exp(iφl), where φ is the angle of antenna in the circle, l is the OAM mode order, then the beamformed port may be an equivalent OAM mode l. By using different beamforming weights exp(iφl'), where l'≠l, the transmitter 505 may generate multiple OAM modes.

For a channel matrix, H, from each transmit antenna 520 to each receive antenna 530, the beamformed channel matrix $\tilde{H}=H\cdot[w_1, w_2, \ldots, w_L]$, and any two columns of $\tilde{H}$ are orthogonal. Thus, the beamformed ports have no crosstalk. As a result, UCA OAM-based communication may realize high-level spatial multiplexing degree efficiently. In some cases, a center antenna 535 of the transmitter 505 and/or the center antenna 540 of the receiver 510 may be used to generate a mode 0. For example, the center antenna 535 and/or 540 may be used alone (without any other antenna of the respective circle) to generate the mode 0.

As explained above, OAM communications may use SPP or UCA antennas to transmit multiple orthogonal signals with different OAM modes. SPP-based OAM generates continuous spiral waves, and thus can form unlimited number of orthogonal OAM modes in theory. But in practice, due to propagation divergence and one mode per SPP, the number of effective OAM modes is limited (e.g., four modes in academic experiment). UCA-based OAM generates discrete spiral waves, and thus can form as many OAM modes as there are transmitter antennas. UCA-based OAM may be considered to be a form of MIMO whose eigen-based transmission precoding weights and reception combining weights are constantly equal to a discrete Fourier transform matrix, which is unaffected by communication parameters (e.g., distance, aperture size and carrier frequency) and thus can be implemented at low cost.

Figure 6:
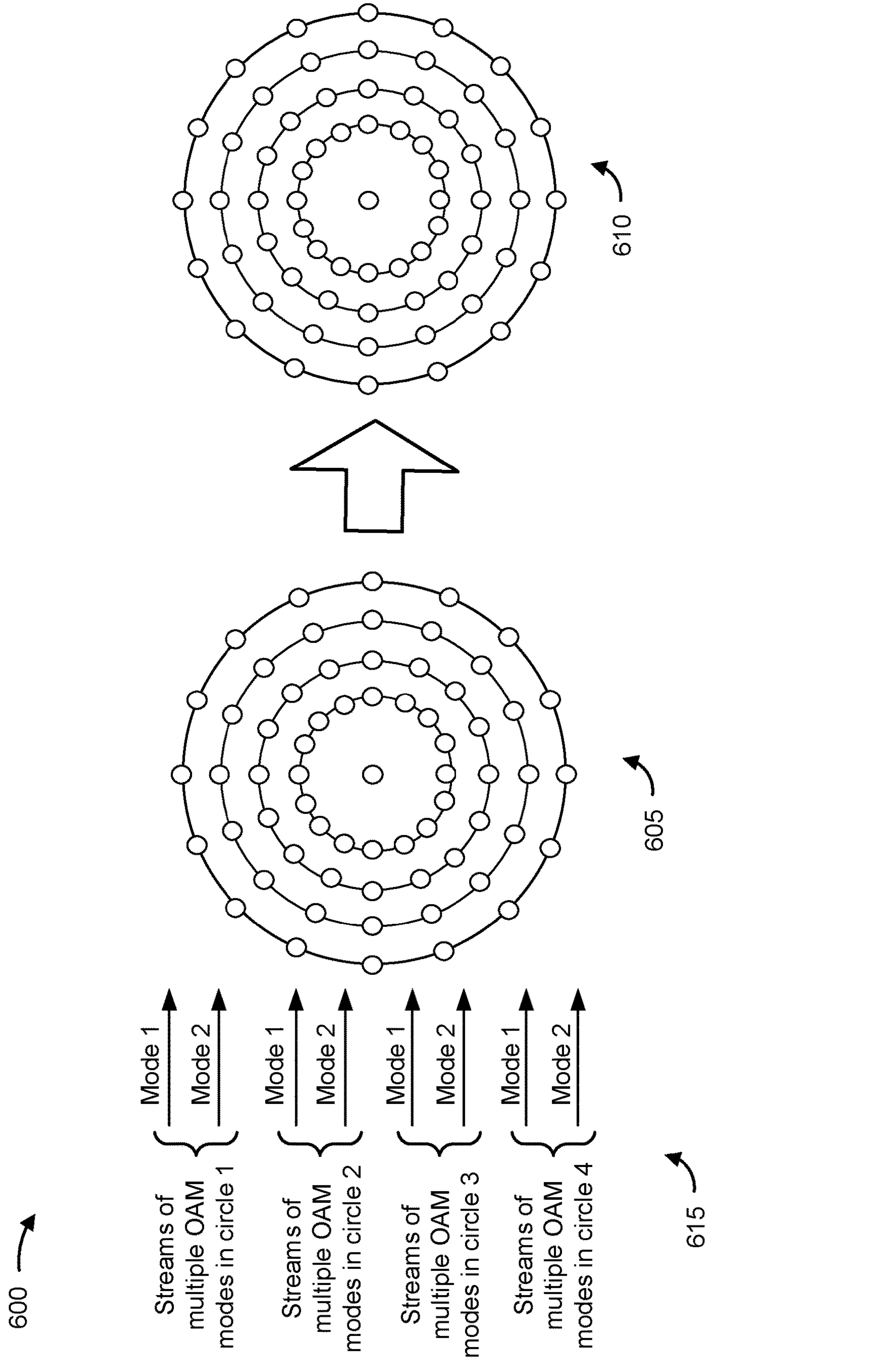
FIGS. 6-8 are diagrams illustrating examples associated with co-axial multi-circle OAM multiplexing based communication, in accordance with the present disclosure.

FIG. 6 is a diagram illustrating an example 600 associated with co-axial multi-circle OAM multiplexing based communication, in accordance with the present disclosure. The multi-circle OAM multiplexing based communication may refer to communication between a transmitter 605 and a receiver 610. Multiple co-axial UCA antenna circles and/or multiple co-axial SPP-based apertures may be implemented at the transmitter 605 and the receiver 610.

As shown by reference number 615, a number of data streams of different OAM modes may be transmitted using each circle of the multi-circle transmitter 605. For example, as shown, a first data stream of each circle may be transmitted using a first OAM mode ("Mode 1"), and a second data stream of each circle may be transmitted using a second OAM mode ("Mode 2"). In some aspects, the intra-circle streams may be orthogonal. The inter-circle streams may be orthogonal with different OAM modes or non-orthogonal with the same OAM mode. For each OAM mode, there may be inter-circle interferences. For example, a stream transmitted from one circle using Mode 1 may be mutually interfered with a stream transmitted from another circle using Mode 1.

For a co-axial multi-circle OAM-based communication system, the channel gains of streams from each circle may be different for each OAM mode. For example, for a certain set of system parameters (including, for example, communication distance, radiuses of each transmitter circle, radiuses of each receiver circle, carrier frequency, and/or number of antennas in a circle): for OAM mode −2 and 2, a transmitter circle with radius=0.8 meters may have the largest channel gain; for OAM mode −1 and 1, the transmitter circle with radius=0.6 meters may have the largest channel gain; and for OAM mode 0, the transmitter circle with radius=0.2 meters may have the largest channel gain. Therefore, to achieve the highest data throughput, mode selection can be used to select a mode for each transmitter circle that corresponds to an optimal transmitter circle.

Based on the theory of Green function (waveform from a single point source with the same boundary condition), the relevant Maxwell equations, or Helmholtz equation as their scalar equivalence in our OAM setup, can be solved in an integral form, which is the equivalent to Huygens-Fresnel principle. The signal at receiver plane v can be written as a function of transmitter signal u as $$v = \int\int u \frac{\exp(jkr)}{r} \psi dS$$

where ψ=cos θ or some other function of the angle of propagation close to cos θ. In the current problem, ψ≈1. Using simulation, for example, eigen modes can be found using singular value decomposition (SVD) of the transfer matrix.

As indicated above, FIG. 6 is provided as an example. Other examples may differ from what is described with regard to FIG. 6.

Figure 7:
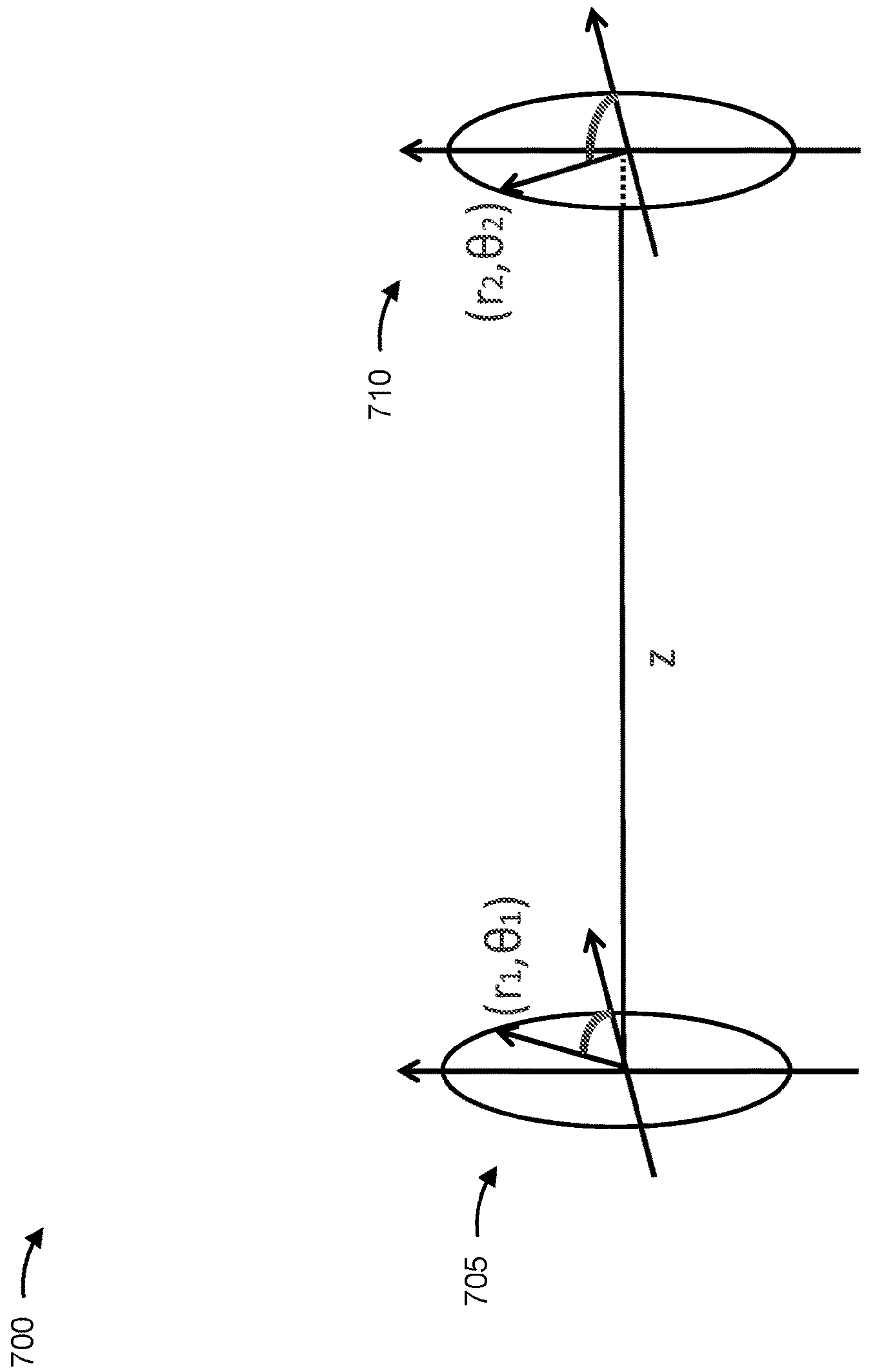

FIG. 7 is a diagram illustrating an example 700 associated with co-axial multi-circle OAM multiplexing based communication, in accordance with the present disclosure. Example 700 is associated with mode selection and includes a conceptual representation of an OAM transmitter 705 that communicates with an OAM receiver 710. In some aspects, mode selection may be performed by determining a solution to the Maxwell/Helmholtz equations indicated above.

In some aspects, for example, an integral solution with discreet angular sampling may be used. To perform the discreet angular sampling method in an implementation with N transmitter antennas and N receiver antennas, the transfer matrix H can be found as (ignoring the cosine factor in the amplitude in Huygens-Fresnel formula):

$$H_{m,n} \propto \frac{\exp\left(jk\sqrt{z^2 + (r_1\cos\theta_1 - r_2\cos\theta_2)^2 + (r_1\sin\theta_1 - r_2\sin\theta_2)^2}\right)}{\sqrt{z^2 + (r_1\cos\theta_1 - r_2\cos\theta_2)^2 + (r_1\sin\theta_1 - r_2\sin\theta_2)^2}} =$$

-continued $$\frac{\exp\left\{jk\sqrt{z^2+r_1^2+r_2^2-2r_1r_2\cos(\theta_1-\theta_2)}\right\}}{\sqrt{z^2+r_1^2+r_2^2-2r_1r_2\cos(\theta_1-\theta_2)}}.$$

As shown, the transmitter plane and receiver plane are vertical to a z-axis. The transmitter antenna 705 and/or receiver antenna 710 can have angular offset.

It may be noted that H is cyclic, which implies that its eigenvectors are discrete Fourier transform (DFT) vectors:

$$v_\mu=\exp\left\{j\frac{2\pi\mu v}{N}\right\},\ \mu=0,1,\ \ldots\ (N-1),\ v=0,1,\ \ldots\ .(N-1),$$

where μ is the vector index of DFT vector and v is the element index in each DFT vector. In this representation, the μ-th DFT vector corresponds to the μ-th OAM waveform. In some cases, with N transmitters and N receivers per circle, all OAM modes with azimuth order<=N are orthogonal. However, with N transmitter and receiver antennas, OAM modes of order N or higher are not orthogonal at the receiver 710.

The DFT/azimuth mode strength (approximate result per circle pair) can be determined using Taylor expansion approximations:

$$\sqrt{z^2+r_1^2+r_2^2-2r_1r_2\cos(\theta_1-\theta_2)}=$$
$$z\sqrt{1+\frac{r_1^2+r_2^2-2r_1r_2\cos(\theta_1-\theta_2)}{z^2}}\approx z\left(1+\frac{r_1^2+r_2^2-2r_1r_2\cos(\theta_1-\theta_2)}{2z^2}\right)=$$
$$z+\frac{r_1^2+r_2^2}{2z}-\frac{r_1r_2\cos(\theta_1-\theta_2)}{z}.$$

$$\text{Then: } H_{m,n}\propto\frac{\exp\left\{jk\sqrt{z^2+r_1^2+r_2^2-2r_1r_2\cos(\theta_1-\theta_2)}\right\}}{\sqrt{z^2+r_1^2+r_2^2-2r_1r_2\cos(\theta_1-\theta_2)}}\approx$$
$$\frac{\exp\left\{jkz\sqrt{1+\frac{r_1^2+r_2^2-2r_1r_2\cos(\theta_1-\theta_2)}{z^2}}\right\}}{z+\frac{r_1^2+r_2^2}{2z}-\frac{2r_1r_2\cos(\theta_1-\theta_2)}{z}}\approx$$
$$\frac{\exp\{jk(z+\frac{r_1^2+r_2^2}{2z})\}}{z}\exp\left\{\frac{-jkr_1r_2\cos(\theta_1-\theta_2)}{z}\right\}.$$

Without losing generality, assuming $\theta_1=0$, $\theta_2=0$, ignoring all common terms among receiver antennas:

$$H_{m,n}\propto\exp\left\{\frac{-jkr_1r_2\cos\theta}{z}\right\}=\exp\left\{-j2\pi\frac{r_1r_2}{\lambda z}\cos\theta\right\},$$

where θ=0, 2π/N, . . . , 2(N−1) π/N, and wherein the critical term is $$\exp\left\{-j2\pi\frac{r_1r_2}{\lambda z}\cos\theta\right\}$$

and a row vector is $$\exp\left\{-j2\pi\frac{r_1r_2}{\lambda z}\cos\frac{2\pi p}{N}\right\},$$

p=0, 1, . . . (N−1).

It is known that $$\int_0^\pi e^{i\beta\cos x}$$

cos nx dx=$i^n\pi J_n(\beta)$ and, therefore, $$\int_{-\pi}^\pi e^{i\beta\cos x}$$

sin nx dx=0, because sin nx is odd. In addition, $$\int_{-\pi}^\pi e^{i\beta\cos x}$$

cos nx dx=$i^n 2\pi J_n(\beta)$. It follows that the n-th eigenvalue of H is $$\sum_{p=0}^{N-1}\exp\left\{-j\frac{2\pi pn}{N}\right\}\exp\left\{-j2\pi\frac{r_1r_2}{\lambda z}\cos\frac{2\pi p}{N}\right\}=$$
$$\propto\int_{-\pi}^{\pi}\exp\left\{-j2\pi\frac{r_1r_2}{\lambda z}\cos\theta\right\}\exp\{-j2\pi n\theta\}d\theta\propto J_n\left(\frac{2\pi r_1r_2}{\lambda z}\right),$$

where $J_n$ is the strength of the signal associated with an azimuth mode n, $r_1$ is the transmitter circle radius, $r_2$ is the receiver circle radius, λ is the wavelength, and z is the distance between the transmitter and the receiver.

As indicated above, FIG. 7 is provided as an example. Other examples may differ from what is described with regard to FIG. 7.

Figure 8:
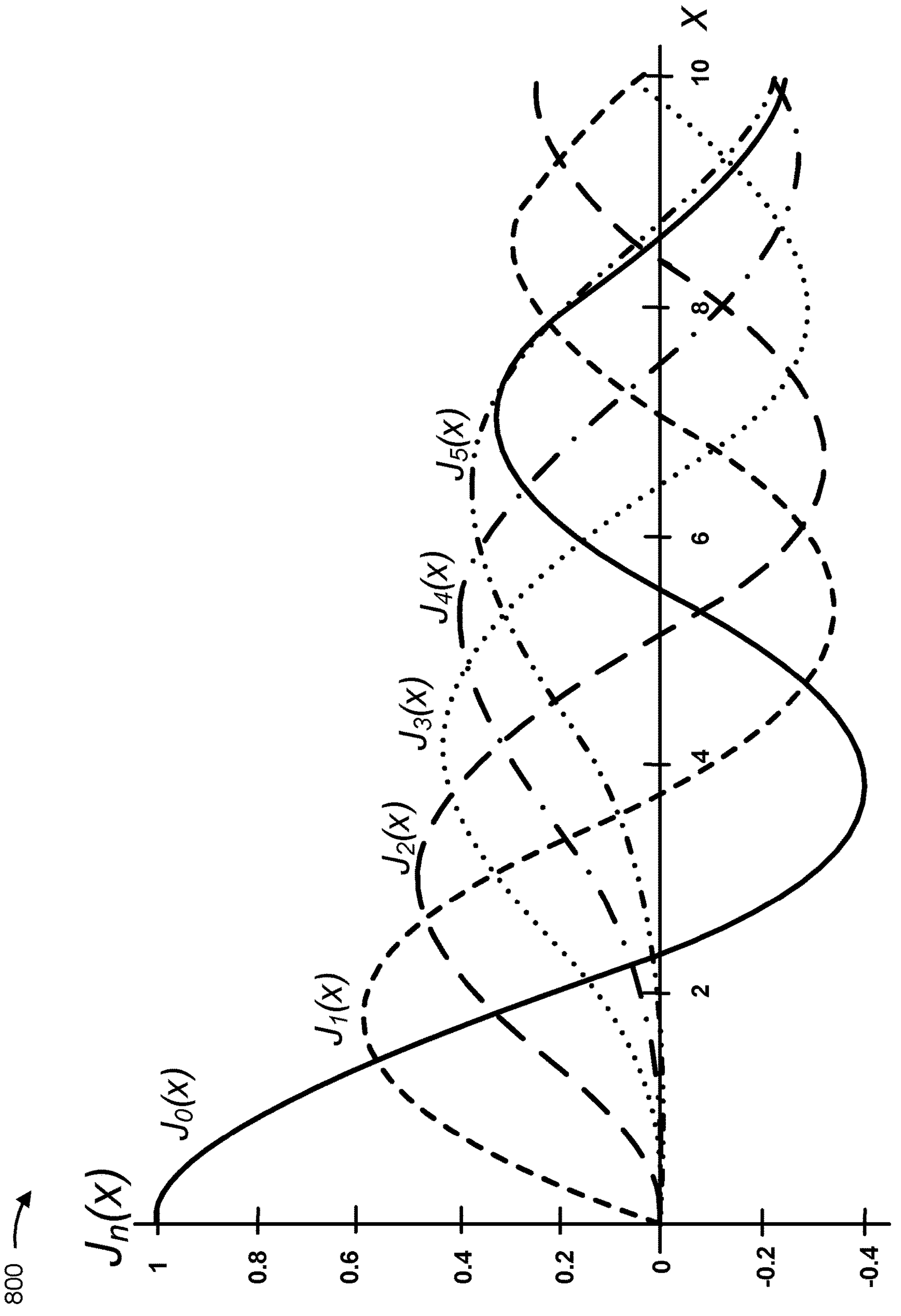

FIG. 8 is a diagram illustrating an example 800 associated with co-axial multi-circle OAM multiplexing based communication, in accordance with the present disclosure. Example 800 illustrates a plot of the strength, $J_n(x)$, of signals associated with a number of different modes, where $$x=\left(\frac{2\pi r_1r_2}{\lambda z}\right)$$

and n is the mode. As shown, the strength of the signal for each of mode 0, mode 1, mode 2, mode 3, mode 4, and mode 5 have a staggered response. For example, if two modes have a 0 strength at a same value of x, the signal would not be received. As shown, however, the staggered nature of the modes indicates that different modes may be used for transmit diversity, in which a data stream is transmitted using two or more different modes.

Closed-loop transmit diversity using a number of different modes may result in increased transmission overhead and computational overhead due to the receiving device performing measurements for each signal transmitted and transmission of feedback associated with each measurement. According to some aspects of the techniques and apparatuses described herein, open-loop transmission with transmit diversity may be used to facilitate OAM multiplexing communications.

Various properties of $$J_n\left(\frac{2\pi r_1 r_2}{\lambda z}\right)$$

may facilitate open-loop transmission for azimuth modes. For example, r1 and λ are known at the transmitter. At a particular z, for an r1, the maximum response for a higher mode happens at a larger r2. At a particular z, for an r2, the best transmitting circle for a higher mode is with a larger r1. Using the center r1=0 for mode 0 may produce a strong signal, as $J_0(O)=1$. Using the center for another mode may not produce a strong signal, as $J_n(O)=0$, if n>0. There may be no interference across circles (on the circle response level). For example, the signal from one transmitter circle propagates to all the receiver circles, but this may not cause interference on the circle level because different receiver circles may attempt to detect different modes. Additionally, consecutive mode orders may be used for transmit diversity, due to the fact that at $$J_n\left(\frac{2\pi r_1 r_2}{\lambda z}\right) = 0,\ J_{n-1}\left(\frac{2\pi r_1 r_2}{\lambda z}\right) \neq 0 \text{ and } J_{n+1}\left(\frac{2\pi r_1 r_2}{\lambda z}\right) \neq 0.$$

In this way, use of consecutive mode orders may ensure at least one non-zero signal response at all times.

In some aspects, a transmitter of an OAM multiplexing based communication may determine an OAM azimuth mode assignment for open-loop transmission of a data stream using transmit diversity. The OAM azimuth mode assignment may include an assignment of two or more OAM azimuth modes to the data stream. The two or more OAM azimuth modes may include consecutive mode orders. The transmitter may transmit, to a receiver of the OAM multiplexing based communication, the data stream based at least in part on the OAM azimuth mode assignment. In this way, aspects may facilitate open-loop transmission with transmit diversity. As a result, aspects may facilitate increases in throughput, signal reliability, signal quality, and/or the like without unnecessary increases in communication overhead and/or power consumption.

As indicated above, FIG. 8 is provided as an example. Other examples may differ from what is described with regard to FIG. 8.

Figure 9:
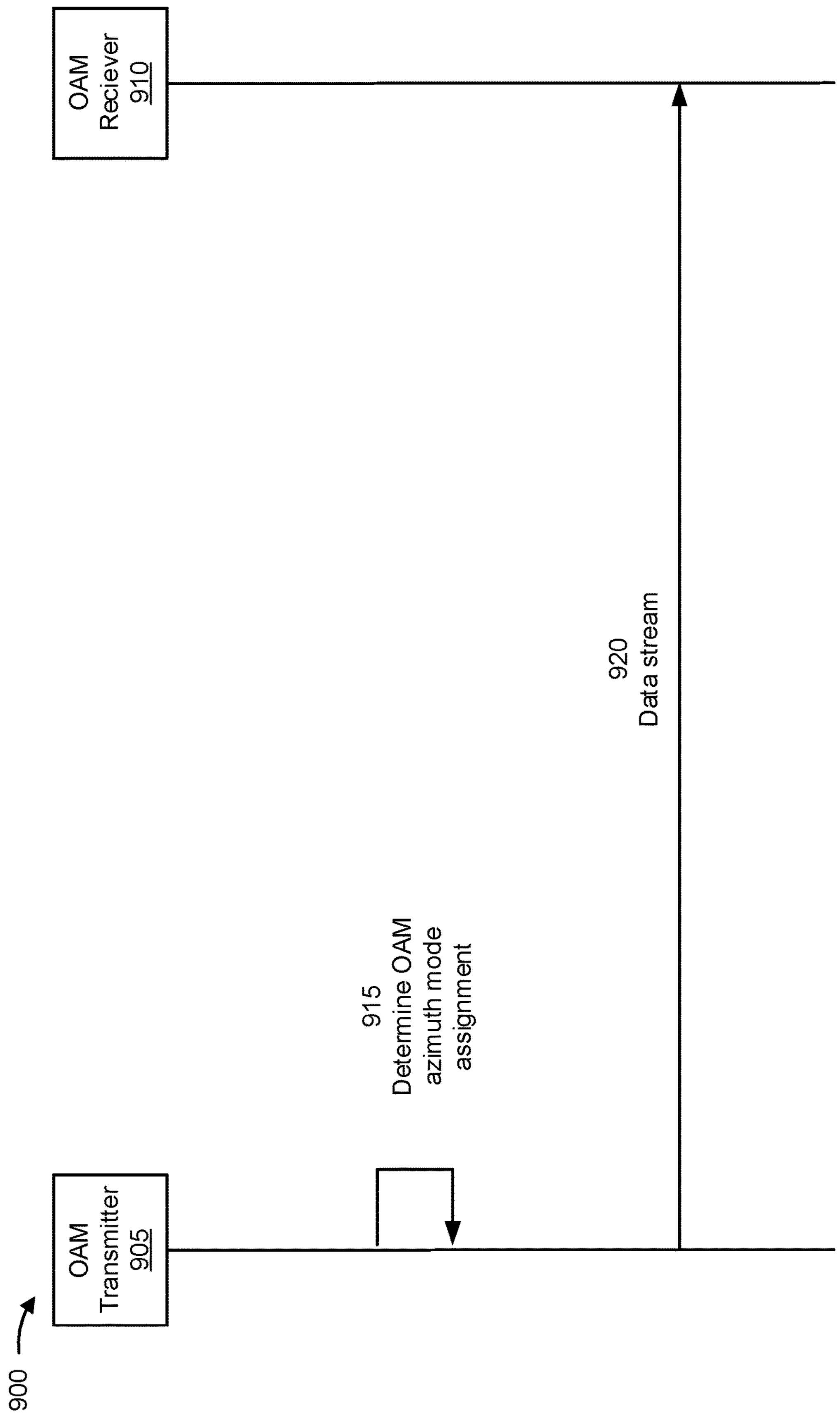
FIG. 9 is a diagram illustrating an example associated with open-loop transmission with transmit diversity in OAM multiplexing based communications, in accordance with the present disclosure.

FIG. 9 is a diagram illustrating an example 900 associated with open-loop transmission with transmit diversity in OAM multiplexing based communications, in accordance with the present disclosure. As shown in FIG. 9, a transmitter for an OAM multiplexing based communication (shown as OAM transmitter 905) and a receiver for an OAM multiplexing based communication (shown as OAM receiver 910) may communicate with one another. In some aspects, the OAM transmitter and/or the OAM receiver 910 may include, be included in, or be similar to a base station 110 and/or a UE 120, among other examples.

As shown by reference number 915, the OAM transmitter 905 may determine an OAM azimuth mode assignment for open-loop transmission of a data stream using transmit diversity. In some aspects, the OAM azimuth mode assignment may include an assignment of two or more OAM azimuth modes to the data stream. In some aspects, determining the OAM azimuth mode assignment comprises assigning the two or more OAM azimuth modes to the data stream based at least in part on at least one of: a distance between the transmitter and the receiver or a size of the receiver. In some aspects, the OAM transmitter 905 may determine the OAM azimuth mode assignment by assigning the two or more OAM azimuth modes to the data stream based at least in part on at least one of a distance between the transmitter and the receiver or a size of the receiver. In some aspects, the OAM transmitter 905 may determine the OAM azimuth mode assignment without receiving channel quality index feedback from the OAM receiver 910.

As shown by reference number 920, the OAM transmitter 905 may transmit, and the OAM receiver 910 may receive, the data stream based at least in part on the OAM azimuth mode assignment. In some aspects, the OAM transmitter 905 may transmit the data stream without beamforming between the two or more OAM azimuth modes. In some aspects, the data stream may be transmitted (e.g., the data stream may be transmitted using the two or more OAM azimuth modes) using at least one of a first transmitter circle or a second transmitter circle, and the OAM azimuth mode assignment may include an assignment of the first transmitter circle to a first OAM azimuth mode of the two or more OAM azimuth modes and an assignment of the first transmitter circle or the second transmitter circle to a second OAM azimuth mode of the two or more OAM azimuth modes. A first mode order corresponding to the first OAM azimuth mode and a second mode order corresponding to the second OAM azimuth mode may be consecutive mode orders.

In some aspects, the OAM transmitter 905 may transmit the data stream by transmitting a first transmission of the data stream using the first OAM azimuth mode and transmitting a second transmission of the data stream using the second OAM azimuth mode. The first transmission may be independent of the second transmission.

In some aspects, the OAM transmitter 905 may transmit the data stream by transmitting a plurality of data streams by applying two polarizations to each of the first OAM azimuth mode and the second OAM azimuth mode. The two polarizations may include two linear polarizations. For example, the two linear polarizations may include a horizontal polarization and a vertical polarization. In some aspects, the two polarizations may include two circular polarizations or two elliptical polarizations. For example, the circular polarizations or the two elliptical polarizations may include a clockwise polarization and a counter-clockwise polarization As indicated above, FIG. 9 is provided as an example. Other examples may differ from what is described with regard to FIG. 9.

Figure 10:
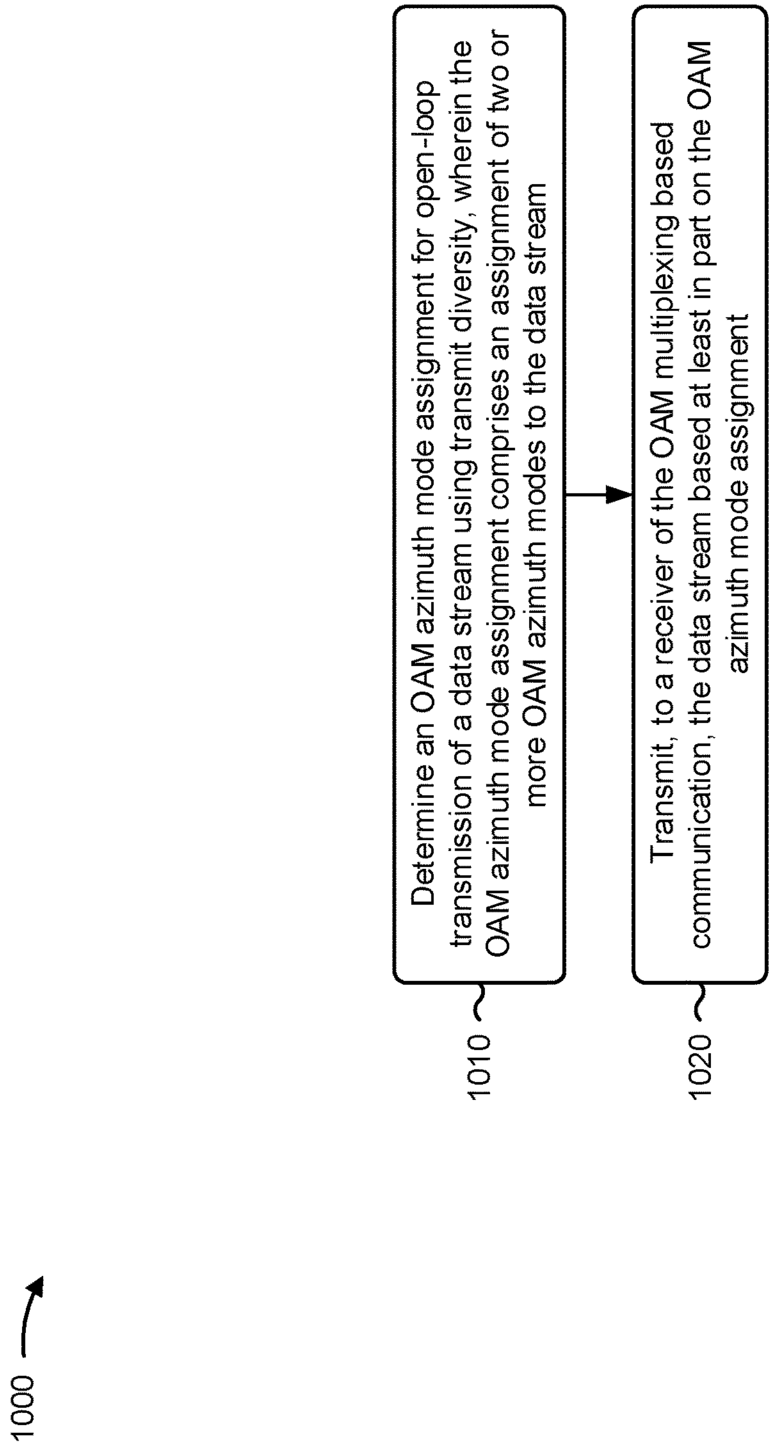
FIGS. 10 and 11 are diagrams illustrating example processes associated with open-loop transmission with transmit diversity in OAM multiplexing based communications, in accordance with the present disclosure.

FIG. 10 is a diagram illustrating an example process 1000 performed, for example, by a transmitter, in accordance with the present disclosure. Example process 1000 is an example where the transmitter (e.g., OAM transmitter 905) performs operations associated with open-loop transmission with transmit diversity in OAM multiplexing based communications.

As shown in FIG. 10, in some aspects, process 1000 may include determining an OAM azimuth mode assignment for open-loop transmission of a data stream using transmit diversity, wherein the OAM azimuth mode assignment comprises an assignment of two or more OAM azimuth modes to the data stream (block 1010). For example, the transmitter (e.g., using communication manager 1208 and/or determination component 1210, depicted in FIG. 12) may determine an OAM azimuth mode assignment for open-loop transmission of a data stream using transmit diversity, wherein the OAM azimuth mode assignment comprises an assignment of two or more OAM azimuth modes to the data stream, as described above.

As further shown in FIG. 10, in some aspects, process 1000 may include transmitting, to a receiver of the OAM multiplexing based communication, the data stream based at least in part on the OAM azimuth mode assignment (block 1020). For example, the transmitter (e.g., using communication manager 1208 and/or transmission component 1204, depicted in FIG. 12) may transmit, to a receiver of the OAM multiplexing based communication, the data stream based at least in part on the OAM azimuth mode assignment, as described above.

Process 1000 may include additional aspects, such as any single aspect or any combination of aspects described below and/or in connection with one or more other processes described elsewhere herein.

In a first aspect, the data stream is transmitted using at least one of a first transmitter circle or a second transmitter circle, and wherein the OAM azimuth mode assignment comprises an assignment of the first transmitter circle to a first OAM azimuth mode of the two or more OAM azimuth modes and an assignment of the first transmitter circle or the second transmitter circle to a second OAM azimuth mode of the two or more OAM azimuth modes.

In a second aspect, alone or in combination with the first aspect, a first mode order corresponding to the first OAM azimuth mode and a second mode order corresponding to the second OAM azimuth mode are consecutive mode orders.

In a third aspect, alone or in combination with one or more of the first and second aspects, transmitting the data stream comprises transmitting a first transmission of the data stream using the first OAM azimuth mode, and transmitting a second transmission of the data stream using the second OAM azimuth mode, wherein the first transmission is independent of the second transmission.

In a fourth aspect, alone or in combination with one or more of the first through third aspects, transmitting the data stream comprises transmitting a plurality of data streams by applying two polarizations to each of the first OAM azimuth mode and the second OAM azimuth mode.

In a fifth aspect, alone or in combination with the fourth aspect, the two polarizations comprise two linear polarizations.

In a sixth aspect, alone or in combination with the fifth aspect, the two linear polarizations comprise a horizontal polarization and a vertical polarization.

In a seventh aspect, alone or in combination with the fourth aspect, the two polarizations comprise two circular polarizations or two elliptical polarizations.

In an eighth aspect, alone or in combination with the seventh aspect, the two circular polarizations or the two elliptical polarizations comprise a clockwise polarization and a counter-clockwise polarization.

In a ninth aspect, alone or in combination with one or more of the first through eighth aspects, transmitting the data stream comprises transmitting the data stream without beamforming between the two or more OAM azimuth modes.

In a tenth aspect, alone or in combination with one or more of the first through ninth aspects, determining the OAM azimuth mode assignment comprises assigning the two or more OAM azimuth modes to the data stream based at least in part on at least one of a distance between the transmitter and the receiver, or a size of the receiver.

In an eleventh aspect, alone or in combination with one or more of the first through tenth aspects, determining the OAM azimuth mode assignment comprises determining the OAM azimuth mode assignment without receiving OAM azimuth mode selection feedback from the receiver.

In a twelfth aspect, alone or in combination with one or more of the first through eleventh aspects, determining the OAM azimuth mode assignment comprises determining the OAM azimuth mode assignment without receiving channel quality index feedback from the receiver.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
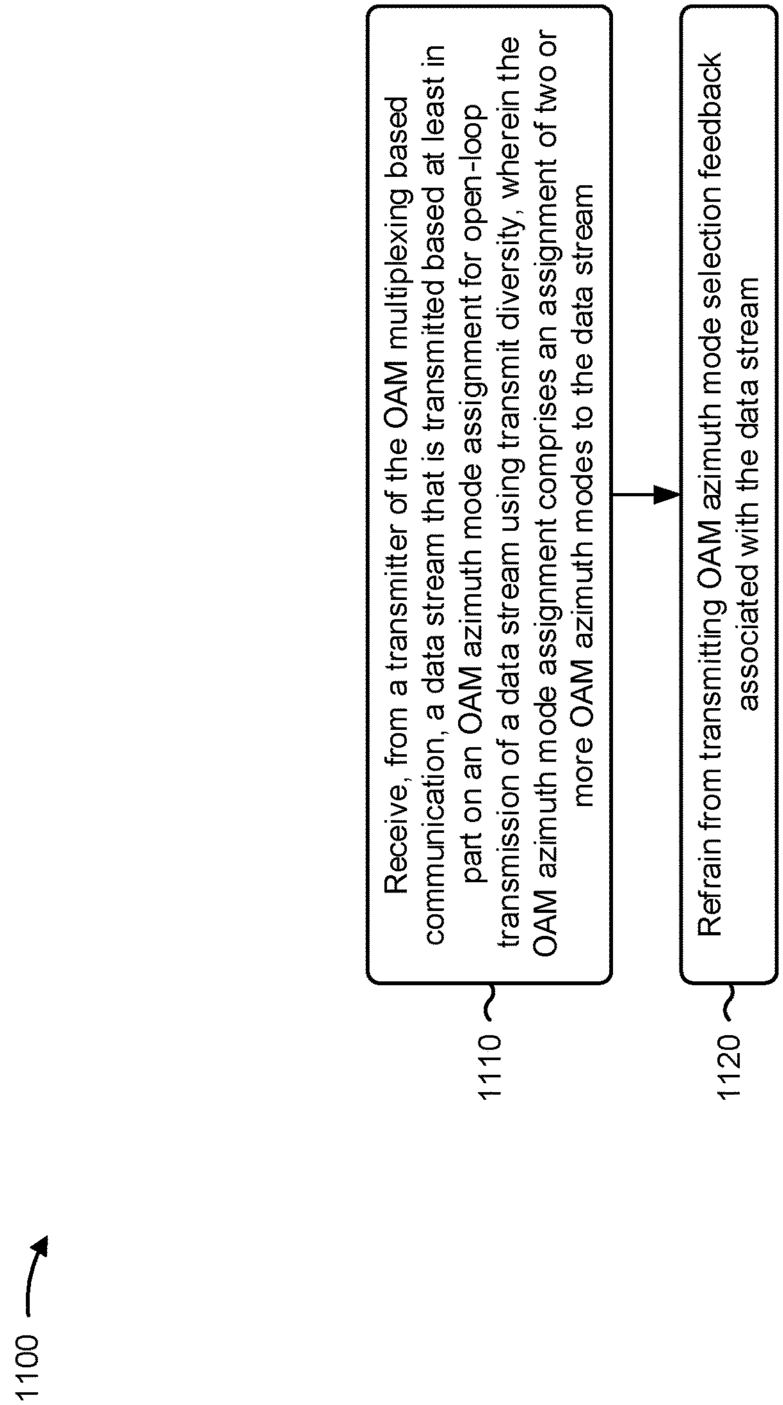

FIG. 11 is a diagram illustrating an example process 1100 performed, for example, by a receiver, in accordance with the present disclosure. Example process 1100 is an example where the receiver (e.g., OAM receiver 910) performs operations associated with open-loop transmission with transmit diversity in OAM multiplexing based communications.

As shown in FIG. 11, in some aspects, process 1100 may include receiving, from a transmitter of the OAM multiplexing based communication, a data stream that is transmitted based at least in part on an OAM azimuth mode assignment for open-loop transmission of a data stream using transmit diversity, wherein the OAM azimuth mode assignment comprises an assignment of two or more OAM azimuth modes to the data stream (block 1110). For example, the receiver (e.g., using communication manager 1308 and/or reception component 1302, depicted in FIG. 13) may receive, from a transmitter of the OAM multiplexing based communication, a data stream that is transmitted based at least in part on an OAM azimuth mode assignment for open-loop transmission of a data stream using transmit diversity, wherein the OAM azimuth mode assignment comprises an assignment of two or more OAM azimuth modes to the data stream, as described above.

As further shown in FIG. 11, in some aspects, process 1100 may include refraining from transmitting OAM azimuth mode selection feedback associated with the data stream (block 1120). For example, the receiver (e.g., using communication manager 1308 depicted in FIG. 13) may refrain from transmitting OAM azimuth mode selection feedback associated with the data stream, as described above.

Process 1100 may include additional aspects, such as any single aspect or any combination of aspects described below and/or in connection with one or more other processes described elsewhere herein.

In a first aspect, the data stream is transmitted using at least one of a first transmitter circle or a second transmitter circle, and wherein the OAM azimuth mode assignment comprises an assignment of the first transmitter circle to a first OAM azimuth mode of the two or more OAM azimuth modes and an assignment of the first transmitter circle or the second transmitter circle to a second OAM azimuth mode of the two or more OAM azimuth modes.

In a second aspect, alone or in combination with the first aspect, a first mode order corresponding to the first OAM azimuth mode and a second mode order corresponding to the second OAM azimuth mode are consecutive mode orders.

In a third aspect, alone or in combination with one or more of the first and second aspects, receiving the data stream comprises receiving a first transmission of the data stream associated with the first OAM azimuth mode, and receiving a second transmission of the data stream associated with the second OAM azimuth mode, wherein the first transmission is independent of the second transmission.

In a fourth aspect, alone or in combination with one or more of the first through third aspects, the data stream includes two polarizations to each of the first OAM azimuth mode and the second OAM azimuth mode.

In a fifth aspect, alone or in combination with the fourth aspect, the two polarizations comprise two linear polarizations.

In a sixth aspect, alone or in combination with the fifth aspect, the two linear polarizations comprise a horizontal polarization and a vertical polarization.

In a seventh aspect, alone or in combination with the fourth aspect, the two polarizations comprise two circular polarizations or two elliptical polarizations.

In an eighth aspect, alone or in combination with the seventh aspect, the two circular polarizations or the two elliptical polarizations comprise a clockwise polarization and a counter-clockwise polarization.

In a ninth aspect, alone or in combination with one or more of the first through eighth aspects, receiving the data stream comprises receiving the data stream without beamforming between the two or more OAM azimuth modes.

In a tenth aspect, alone or in combination with one or more of the first through ninth aspects, the OAM azimuth mode assignment is based at least in part on at least one of a distance between the transmitter and the receiver, or a size of the receiver.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
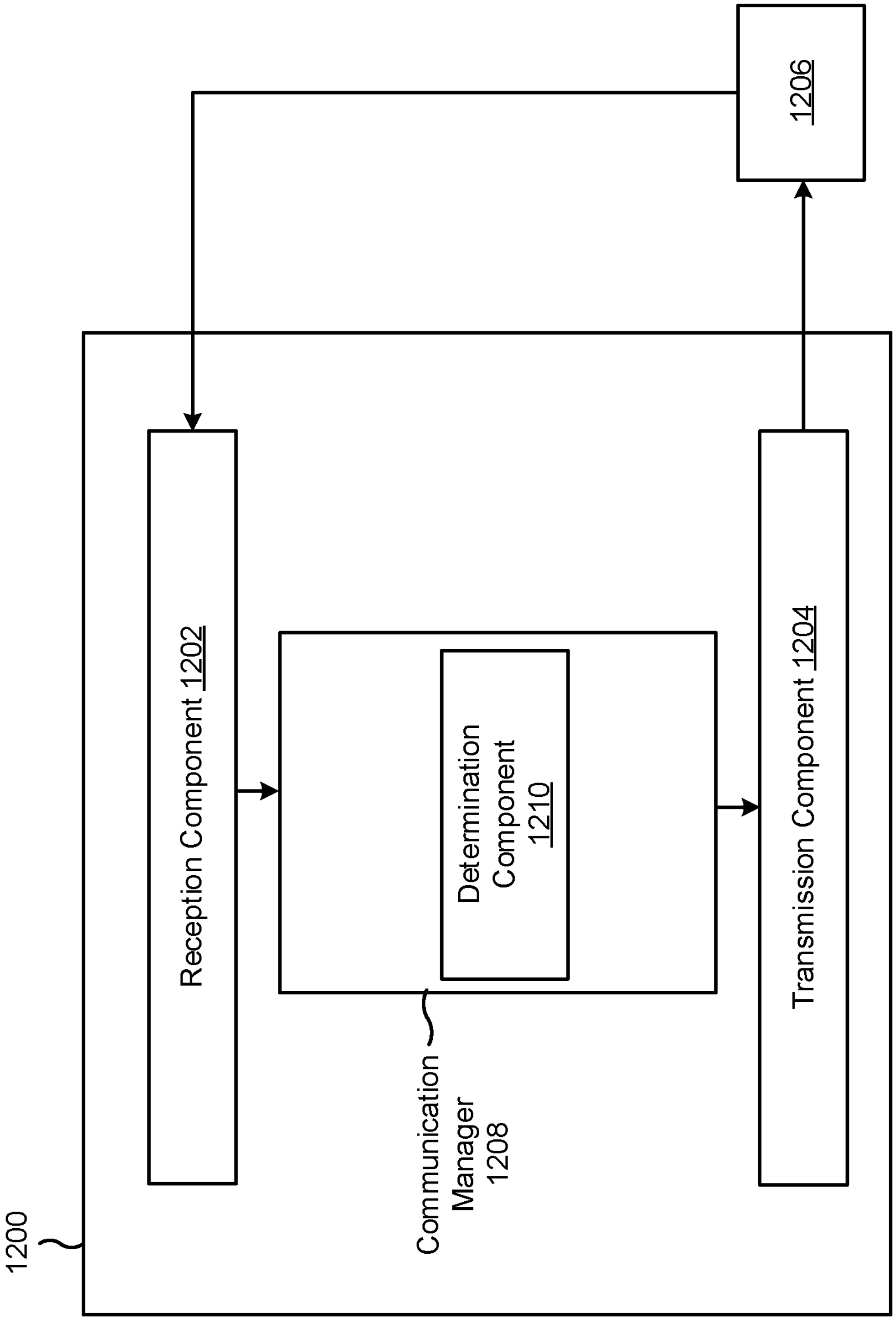
FIGS. 12 and 13 are block diagrams of example apparatuses for wireless communication, in accordance with the present disclosure.

FIG. 12 is a block diagram of an example apparatus 1200 for wireless communication. The apparatus 1200 may be a transmitter, or a transmitter may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a communication manager 1208. The communication manager 1208 may include a determination component 1210.

In some aspects, the apparatus 1200 may be configured to perform one or more operations described herein in connection with FIG. 9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE and/or the base station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the UE and/or the base station described in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE and/or the base station described in connection with FIG. 2. In some aspects, the transmission component 1204 may be co-located with the reception component 1202 in a transceiver.

The determination component 1210 may determine an OAM azimuth mode assignment for open-loop transmission of a data stream using transmit diversity, wherein the OAM azimuth mode assignment comprises an assignment of two or more OAM azimuth modes to the data stream. In some aspects, the determination component 1210 and/or the communication manager 1208 may include one or more antennas, a modulator, a transmit MIMO processor, a transmit processor, a controller/processor, a memory, or a combination thereof, of the UE and/or the base station described in connection with FIG. 2. In some aspects, the determination component 1210 and/or the communication manager 1208 may include the reception component 1202 and/or the transmission component 1204.

The transmission component 1204 may transmit, to a receiver of the OAM multiplexing based communication, the data stream based at least in part on the OAM azimuth mode assignment.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
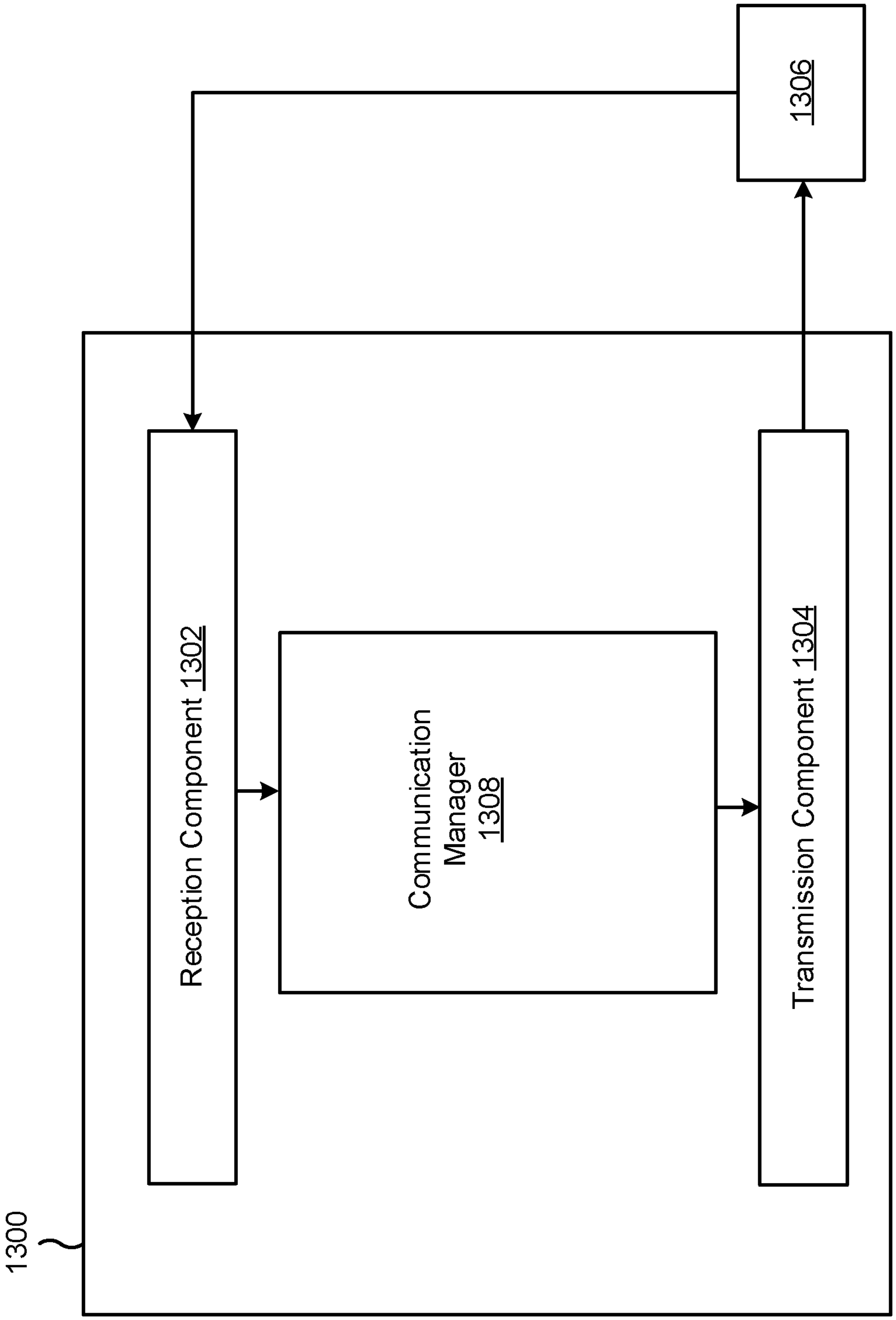

FIG. 13 is a block diagram of an example apparatus 1300 for wireless communication. The apparatus 1300 may be a receiver, or a receiver may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a communication manager 1308.

In some aspects, the apparatus 1300 may be configured to perform one or more operations described herein in connection with FIG. 9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the UE and/or the base station described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the UE and/or the base station described in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE and/or the base station described in connection with FIG. 2. In some aspects, the transmission component 1304 may be co-located with the reception component 1302 in a transceiver.

The reception component 1302 may receive, from a transmitter of the OAM multiplexing based communication, a data stream that is transmitted based at least in part on an OAM azimuth mode assignment for open-loop transmission of a data stream using transmit diversity, wherein the OAM azimuth mode assignment comprises an assignment of two or more OAM azimuth modes to the data stream. The communication manager 1308 may refrain from transmitting OAM azimuth mode selection feedback associated with the data stream. In some aspects, the communication manager 1308 may include one or more antennas, a modulator, a transmit MIMO processor, a transmit processor, a controller/processor, a memory, or a combination thereof, of the UE and/or the base station described in connection with FIG. 2. In some aspects, the communication manager 1308 may include the reception component 1302 and/or the transmission component 1304.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a transmitter of an orbital angular momentum (OAM) multiplexing based communication, comprising: determining an OAM azimuth mode assignment for open-loop transmission of a data stream using transmit diversity, wherein the OAM azimuth mode assignment comprises an assignment of two or more OAM azimuth modes to the data stream; and transmitting, to a receiver of the OAM multiplexing based communication, the data stream based at least in part on the OAM azimuth mode assignment.

Aspect 2: The method of Aspect 1, wherein the data stream is transmitted using at least one of a first transmitter circle or a second transmitter circle, and wherein the OAM azimuth mode assignment comprises an assignment of the first transmitter circle to a first OAM azimuth mode of the two or more OAM azimuth modes and an assignment of the first transmitter circle or the second transmitter circle to a second OAM azimuth mode of the two or more OAM azimuth modes.

Aspect 3: The method of Aspect 2, wherein a first mode order corresponding to the first OAM azimuth mode and a second mode order corresponding to the second OAM azimuth mode are consecutive mode orders.

Aspect 4: The method of Aspect 2, wherein transmitting the data stream comprises: transmitting a first transmission of the data stream using the first OAM azimuth mode; and transmitting a second transmission of the data stream using the second OAM azimuth mode, wherein the first transmission is independent of the second transmission.

Aspect 5: The method of Aspect 2, wherein transmitting the data stream comprises transmitting a plurality of data streams by applying two polarizations to each of the first OAM azimuth mode and the second OAM azimuth mode.

Aspect 6: The method of Aspect 5, wherein the two polarizations comprise two linear polarizations.

Aspect 7: The method of Aspect 6, wherein the two linear polarizations comprise a horizontal polarization and a vertical polarization.

Aspect 8: The method of Aspect 5, wherein the two polarizations comprise two circular polarizations or two elliptical polarizations.

Aspect 9: The method of Aspect 8, wherein the two circular polarizations or the two elliptical polarizations comprise a clockwise polarization and a counter-clockwise polarization.

Aspect 10: The method of Aspect 1, wherein transmitting the data stream comprises transmitting the data stream without beamforming between the two or more OAM azimuth modes.

Aspect 11: The method of Aspect 1, wherein determining the OAM azimuth mode assignment comprises assigning the two or more OAM azimuth modes to the data stream based at least in part on at least one of: a distance between the transmitter and the receiver, or a size of the receiver.

Aspect 12: The method of Aspect 1, wherein determining the OAM azimuth mode assignment comprises determining the OAM azimuth mode assignment without receiving OAM azimuth mode selection feedback from the receiver.

Aspect 13: The method of Aspect 1, wherein determining the OAM azimuth mode assignment comprises determining the OAM azimuth mode assignment without receiving channel quality index feedback from the receiver.

Aspect 14: A method of wireless communication performed by a receiver of an orbital angular momentum (OAM) multiplexing based communication, comprising: receiving, from a transmitter of the OAM multiplexing based communication, a data stream that is transmitted based at least in part on an OAM azimuth mode assignment for open-loop transmission of a data stream using transmit diversity, wherein the OAM azimuth mode assignment comprises an assignment of two or more OAM azimuth modes to the data stream; and refraining from transmitting OAM azimuth mode selection feedback associated with the data stream.

Aspect 15: The method of Aspect 14, wherein the data stream is transmitted using at least one of a first transmitter circle or a second transmitter circle, and wherein OAM azimuth mode assignment comprises an assignment of the first transmitter circle to a first OAM azimuth mode of the two or more OAM azimuth modes and an assignment of the first transmitter circle or the second transmitter circle to a second OAM azimuth mode of the two or more OAM azimuth modes.

Aspect 16: The method of Aspect 15, wherein a first mode order corresponding to the first OAM azimuth mode and a second mode order corresponding to the second OAM azimuth mode are consecutive mode orders.

Aspect 17: The method of Aspect 15, wherein receiving the data stream comprises: receiving a first transmission of the data stream associated with the first OAM azimuth mode; and receiving a second transmission of the data stream associated with the second OAM azimuth mode, wherein the first transmission is independent of the second transmission.

Aspect 18: The method of Aspect 15, wherein the data stream includes two polarizations to each of the first OAM azimuth mode and the second OAM azimuth mode.

Aspect 19: The method of Aspect 18, wherein the two polarizations comprise two linear polarizations.

Aspect 20: The method of Aspect 19, wherein the two linear polarizations comprise a horizontal polarization and a vertical polarization.

Aspect 21: The method of Aspect 18, wherein the two polarizations comprise two circular polarizations or two elliptical polarizations.

Aspect 22: The method of Aspect 21, wherein the two circular polarizations or the two elliptical polarizations comprise a clockwise polarization and a counter-clockwise polarization.

Aspect 23: The method of Aspect 14, wherein receiving the data stream comprises receiving the data stream without beamforming between the two or more OAM azimuth modes.

Aspect 24: The method of Aspect 14, wherein the OAM azimuth mode assignment is based at least in part on at least one of: a distance between the transmitter and the receiver, or a size of the receiver.

Aspect 25: An apparatus for wireless communication at a device, comprising a processor; memory coupled with the processor; and instructions stored in the memory and executable by the processor to cause the apparatus to perform the method of one or more of Aspects 1-13.

Aspect 26: A device for wireless communication, comprising a memory and one or more processors coupled to the memory, the one or more processors configured to perform the method of one or more of Aspects 1-13.

Aspect 27: An apparatus for wireless communication, comprising at least one means for performing the method of one or more of Aspects 1-13.

Aspect 28: A non-transitory computer-readable medium storing code for wireless communication, the code comprising instructions executable by a processor to perform the method of one or more of Aspects 1-13.

Aspect 29: A non-transitory computer-readable medium storing a set of instructions for wireless communication, the set of instructions comprising one or more instructions that, when executed by one or more processors of a device, cause the device to perform the method of one or more of Aspects 1-13.

Aspect 30: An apparatus for wireless communication at a device, comprising a processor; memory coupled with the processor; and instructions stored in the memory and executable by the processor to cause the apparatus to perform the method of one or more of Aspects 14-24.

Aspect 31: A device for wireless communication, comprising a memory and one or more processors coupled to the memory, the one or more processors configured to perform the method of one or more of Aspects 14-24.

Aspect 32: An apparatus for wireless communication, comprising at least one means for performing the method of one or more of Aspects 14-24.

Aspect 33: A non-transitory computer-readable medium storing code for wireless communication, the code comprising instructions executable by a processor to perform the method of one or more of Aspects 14-24.

Aspect 34: A non-transitory computer-readable medium storing a set of instructions for wireless communication, the set of instructions comprising one or more instructions that, when executed by one or more processors of a device, cause the device to perform the method of one or more of Aspects 14-24.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A transmitter of an orbital angular momentum (OAM) multiplexing based communication, comprising:

one or more memories; and one or more processors, coupled to the one or more memories, configured to:

determine an OAM azimuth mode assignment for open-loop transmission of a data stream using transmit diversity without feedback, wherein the OAM azimuth mode assignment comprises an assignment of two or more OAM azimuth modes to the data stream; and transmit, to a receiver of the OAM multiplexing based communication, the data stream based at least in part on the OAM azimuth mode assignment.

2. The transmitter of claim 1, wherein the data stream is transmitted using at least one of a first transmitter circle or a second transmitter circle, and wherein the OAM azimuth mode assignment comprises an assignment of the first transmitter circle to a first OAM azimuth mode of the two or more OAM azimuth modes and an assignment of the first transmitter circle or the second transmitter circle to a second OAM azimuth mode of the two or more OAM azimuth modes.

3. The transmitter of claim 2, wherein a first mode order corresponding to the first OAM azimuth mode and a second mode order corresponding to the second OAM azimuth mode are consecutive mode orders.

4. The transmitter of claim 2, wherein the one or more processors, to transmit the data stream, are configured to:

transmit a first transmission of the data stream using the first OAM azimuth mode; and transmit a second transmission of the data stream using the second OAM azimuth mode, wherein the first transmission is independent of the second transmission.

5. The transmitter of claim 2, wherein the one or more processors, to transmit the data stream, are configured to transmit a plurality of data streams by applying two polarizations to each of the first OAM azimuth mode and the second OAM azimuth mode.

6. The transmitter of claim 5, wherein the two polarizations comprise two linear polarizations.

7. The transmitter of claim 6, wherein the two linear polarizations comprise a horizontal polarization and a vertical polarization.

8. The transmitter of claim 5, wherein the two polarizations comprise two circular polarizations or two elliptical polarizations.

9. The transmitter of claim 8, wherein the two circular polarizations or the two elliptical polarizations comprise a clockwise polarization and a counter-clockwise polarization.

10. The transmitter of claim 1, wherein the one or more processors, to transmit the data stream, are configured to transmit the data stream without beamforming between the two or more OAM azimuth modes.

11. The transmitter of claim 1, wherein the one or more processors, to determine the OAM azimuth mode assignment, are configured to assign the two or more OAM azimuth modes to the data stream based at least in part on at least one of:

a distance between the transmitter and the receiver, or a size of the receiver.

12. The transmitter of claim 1, wherein the one or more processors, to determine the OAM azimuth mode assignment, are configured to determine the OAM azimuth mode assignment without receiving OAM azimuth mode selection feedback from the receiver.

13. The transmitter of claim 1, wherein the one or more processors, to determine the OAM azimuth mode assignment, are configured to determine the OAM azimuth mode assignment without receiving channel quality index feedback from the receiver.

14. A receiver of an orbital angular momentum (OAM) multiplexing based communication, comprising:

one or more memories; and one or more processors, coupled to the one or more memories, configured to:

receive, from a transmitter of the OAM multiplexing based communication, a data stream that is transmitted based at least in part on an OAM azimuth mode assignment for open-loop transmission of a data stream using transmit diversity, wherein the OAM azimuth mode assignment comprises an assignment of two or more OAM azimuth modes to the data stream; and refrain from transmitting OAM azimuth mode selection feedback associated with the data stream.

15. The receiver of claim 14, wherein the data stream is transmitted using at least one of a first transmitter circle or a second transmitter circle, and wherein the OAM azimuth mode assignment comprises an assignment of the first transmitter circle to a first OAM azimuth mode of the two or more OAM azimuth modes and an assignment of the first transmitter circle or the second transmitter circle to a second OAM azimuth mode of the two or more OAM azimuth modes.

16. The receiver of claim 15, wherein a first mode order corresponding to the first OAM azimuth mode and a second mode order corresponding to the second OAM azimuth mode are consecutive mode orders.

17. The receiver of claim 15, wherein the one or more processors, to receive the data stream, are configured to:

receive a first transmission of the data stream associated with the first OAM azimuth mode; and receive a second transmission of the data stream associated with the second OAM azimuth mode, wherein the first transmission is independent of the second transmission.

18. The receiver of claim 17, wherein the data stream comprises a plurality of data streams transmitted by application of two polarizations to each of the first OAM azimuth mode and the second OAM azimuth mode.

19. The receiver of claim 18, wherein the two polarizations comprise two linear polarizations.

20. The receiver of claim 19, wherein the two linear polarizations comprise a horizontal polarization and a vertical polarization.

21. The receiver of claim 18, wherein the two polarizations comprise two circular polarizations or two elliptical polarizations.

22. The receiver of claim 21, wherein the two circular polarizations or the two elliptical polarizations comprise a clockwise polarization and a counter-clockwise polarization.

23. The receiver of claim 14, wherein the one or more processors, to receive the data stream, are configured to receive the data stream without beamforming between the two or more OAM azimuth modes.

24. The receiver of claim 14, wherein the OAM azimuth mode assignment is based at least in part on at least one of:

a distance between the transmitter and the receiver, or a size of the receiver.

25. A method of wireless communication performed by a transmitter of an orbital angular momentum (OAM) multiplexing based communication, comprising:

determining an OAM azimuth mode assignment for open-loop transmission of a data stream using transmit diversity without feedback, wherein the OAM azimuth mode assignment comprises an assignment of two or more OAM azimuth modes to the data stream; and transmitting, to a receiver of the OAM multiplexing based communication, the data stream based at least in part on the OAM azimuth mode assignment.

26. The method of claim 25, wherein the data stream is transmitted using at least one of a first transmitter circle or a second transmitter circle, and wherein the OAM azimuth mode assignment comprises an assignment of the first transmitter circle to a first OAM azimuth mode of the two or more OAM azimuth modes and an assignment of the first transmitter circle or the second transmitter circle to a second OAM azimuth mode of the two or more OAM azimuth modes.

27. The method of claim 26, wherein transmitting the data stream comprises applying two polarizations to each of the first OAM azimuth mode and the second OAM azimuth mode.

28. The method of claim 25, wherein transmitting the data stream comprises transmitting the data stream without beamforming.

29. The method of claim 25, wherein determining the OAM azimuth mode assignment comprises determining the OAM azimuth mode assignment without receiving OAM azimuth mode selection feedback from the receiver.

30. A method of wireless communication performed by a receiver of an orbital angular momentum (OAM) multiplexing based communication, comprising:

receiving, from a transmitter of the OAM multiplexing based communication, a data stream that is transmitted based at least in part on an OAM azimuth mode assignment for open-loop transmission of a data stream using transmit diversity, wherein the OAM azimuth mode assignment comprises an assignment of two or more OAM azimuth modes to the data stream; and refraining from transmitting OAM azimuth mode selection feedback associated with the data stream.

* * * * *